United States Patent [19]

Newell

[11] Patent Number: 4,982,911

[45] Date of Patent: Jan. 8, 1991

[54] BELT DRIVE FOR POWER TRANSFER TO CARTRIDGE

[75] Inventor: Chester W. Newell, San Jose, Calif.

[73] Assignee: Newell Research Corporation, Campbell, Calif.

[21] Appl. No.: 754,673

[22] Filed: Jul. 12, 1985

Related U.S. Application Data

[63] Continuation of Ser. No. 424,897, Sep. 28, 1982, abandoned.

[51] Int. Cl.[5] ............ G11B 15/26; G11B 15/43; G11B 23/04
[52] U.S. Cl. ................... 242/192; 242/199; 360/96.3
[58] Field of Search ........... 242/192, 197, 198, 199, 242/200, 206, 207, 208, 209, 210, 55.19 A; 226/188, 181, 183; 360/96.3, 96.4, 85, 132

[56] References Cited

U.S. PATENT DOCUMENTS

| | | | |
|---|---|---|---|
| 476,986 | 6/1882 | Edison | 474/87 |
| 1,394,328 | 10/1921 | Miller | 474/139 |
| 2,288,983 | 7/1942 | Weiss | 242/55.19 A |
| 3,244,341 | 4/1966 | Gilman | 226/188 |
| 3,583,618 | 6/1971 | Lewis | 226/188 X |
| 3,692,255 | 9/1972 | Von Behren | |
| 3,741,564 | 6/1973 | Schulz | 226/188 X |
| 4,054,253 | 10/1977 | Heurtier | 242/192 X |
| 4,072,279 | 2/1978 | Lewis | 242/192 |
| 4,106,686 | 8/1978 | Valliant et al. | 226/188 |
| 4,123,789 | 10/1978 | Statavsky | 360/96 |
| 4,172,569 | 10/1979 | Newell | 242/192 |
| 4,202,719 | 5/1980 | Linn | 226/188 X |
| 4,242,709 | 12/1980 | Stricker | 242/192 X |
| 4,313,144 | 1/1982 | Waddington | 242/199 X |

FOREIGN PATENT DOCUMENTS 109806  8/1979  Japan ................... 360/96.3

Primary Examiner—Harvey C. Hornsby
Assistant Examiner—Scott J. Haughland
Attorney, Agent, or Firm—Thomas Schneck

[57] ABSTRACT

A drive system for capstan driven magnetic tape rolls in which a power belt is trained around a drive wheel and a pair of belt guides. The belt guides are closely spaced relative to the capstan so that the back side of the belt transfers power to the capstan roller while the inner surface of the belt contacts the drive wheel and belt guides. The angular spacing of the belt guides relative to the capstan roller is such that the angle between the axial centers of the belt guides with respect to the axial center of the capstan roller is as large as practical, thereby increasing the frictional surface transferring power from the drive wheel to the capstan roller.

26 Claims, 3 Drawing Sheets

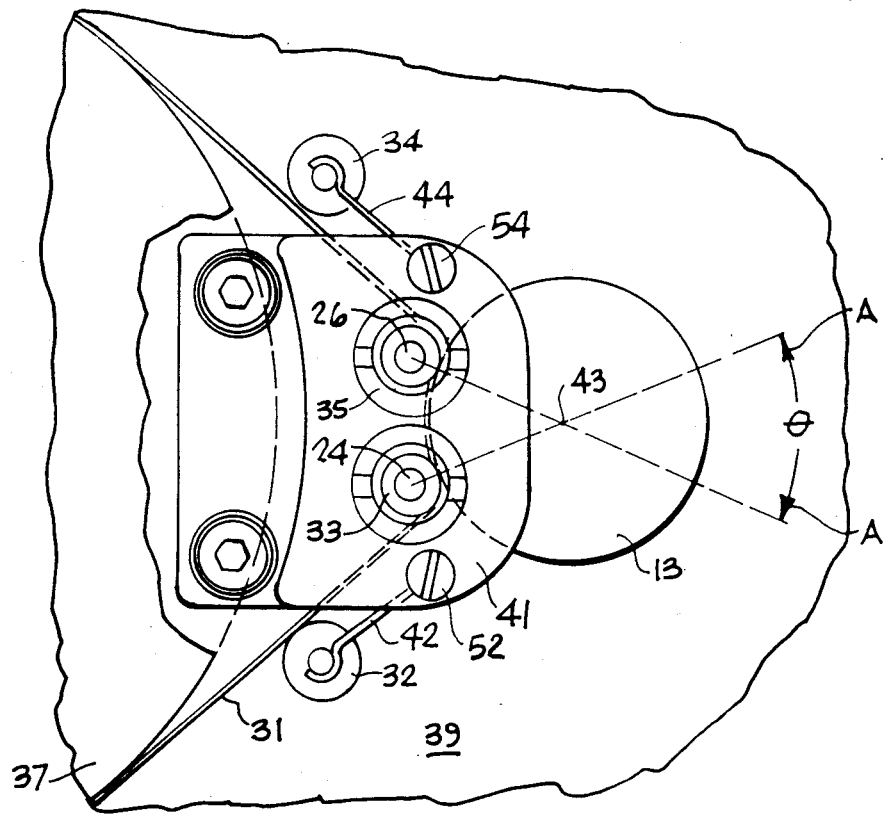
_Fig.2_
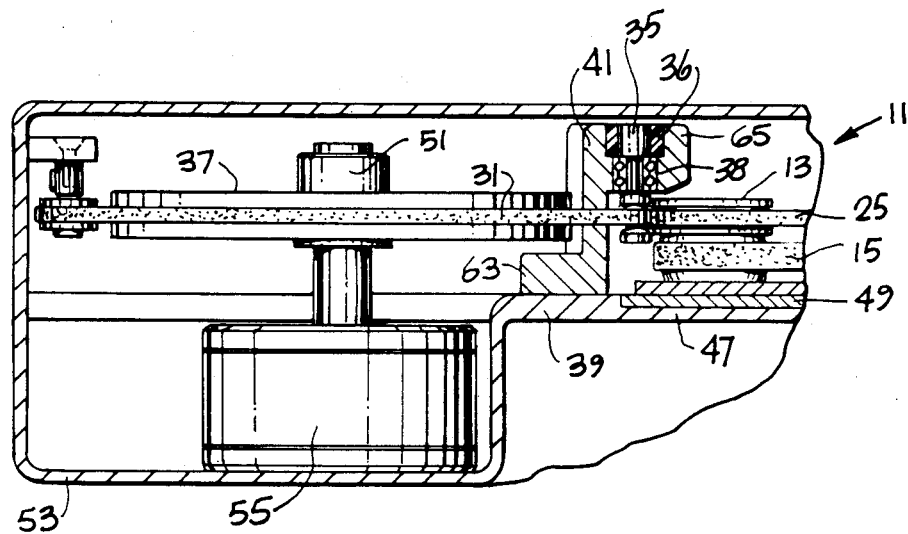
_Fig.3_

BELT DRIVE FOR POWER TRANSFER TO CARTRIDGE

This is a continuation of co-pending application Ser. No. 424,897 filed on Sept. 28, 1982, now abandoned.

DESCRIPTION

1. Technical Field

The invention relates to winding and reeling of magnetic tape rolls, and in particular to a system for transferring power from a motor to a tape cartridge by means of a belt.

2. Background Art

In the past 10 years, high speed magnetic tape cartridges have been developed for use with tape drives which allow rapid acceleration and deceleration of the tape. Such drives and cartridges are especially useful with small computers and are illustrated in U.S. Pat. No. 3,692,255 to Von Behren and U.S. Pat. No. 4,172,569 to Newell.

Such cartridges have two spaced apart reels for winding tape and three guide rollers, arranged in a triangle, for supporting a tape roll drive belt which contacts peripheral tape roll regions. Two of the guide rollers are usually at opposite rear corners of the cartridge, forming the base of the triangle, while the third guide roller is at a forward central region of the cartridge, forming the apex of the triangle. To drive tape, the forward central guide roller of the cartridge is pushed against a rotating capstan, or a pressure wheel communicating with a capstan, in turn associated with a motor. The capstan, directly or through a pressure wheel, applies torque to the periphery of the forward central roller which, in turn, causes drive belt and tape motion.

In many prior tape systems, in particular capstan driven cartridges, either the forward guide roller or the drive capstan has a compliant outer surface, such as urethane rubber, in order to positively engage the driven member imparting a working force thereto. The compliant outer surface is firmly pushed against the driven member, deforming the compliant surface. In order to achieve higher tape velocity while maintaining the same or shorter inter-record gap (IRG) it is necessary to couple more energy into the driven member during acceleration. The amount of energy required varies as the square of the terminal velocity. Any attempt to couple significantly more energy into the driven member than in the prior art creates several problems. First, repeated shearing deformations of the compliant member induce a fatigue failure possibility, and large shearing angles introduce a delay and overshoot in the terminal velocity. Second, wear of the compliant member creates particulate debris which lands on tape surfaces, thereby creating data errors. Third, the compliant surface is subject to compression set, caused by cold-flow of the rubber under high pressure. This creates a flat spot, causing timing errors in the recorded signal. Fourth, while the foregoing problems can be reduced by increasing the hardness of the compliant outer surface of the capstan, increasing hardness reduces the coupling friction between the capstan and the driven roller, and slip may occur. U.S. Pat. No. 4,172,569 to Newell teaches a method whereby a stiff internal drive belt may be employed to achieve high velocities and high acceleration rates. In the prior art for drives for this type of cartridge, performance is now limited by the amount of working force and hence energy which can be coupled into such a cartridge due to the adverse interaction between friction with shearing, abrasion, and compression-set.

It has been found that three drives manufactured by leading drive manufacturers in the industry for the most popular type of cartridge employ capstans of three different hardnesses, but optimized as to tire thickness in each case for acceptable compression-set (timing error). When these drives are employed with a cartridge described in U.S. Pat. No. 4,172,569 in systems compatible with vacuum-column drives and meeting American National Standards Institute (ANSI) specifications for such drives and cartridges, it is imperative that acceleration be limited on the one hand so as not to exceed a maximum shear angle and overshoot imposed by the softness of the resilient capstan, while on the other hand, not to exceed the slip point imposed by the corresponding friction of the capstan. The limitations of these two effects on maximum velocity attainable within the cited standard IRG are plotted for the three typical prior-art drives. It will be noted from FIG. 4 that the highest practical friction coefficient for such a drive capstan would be approximately 0.7, which limits the maximum read/write velocity to approximately 30 inches per second (ips). Vacuum-column drives operate at read/write tape velocities of 45 ips and upward. In order for this cartridge system to be compatible in computers with controllers and formatters standardized for vacuum-column systems, it is necessary to couple more energy into the cartridge than can be transferred through prior-art capstans.

Not all cartridges are driven by a single capstan. In an effort to achieve low mass and low inertia for rapid acceleration and deceleration of the tape, some prior drives have utilized two spaced-apart capstans engaging opposite sides of a pressure roll which drives the tape rolls, as in U.S. Pat. No. 4,123,789 to R. Shatavsky. In the aforementioned patent, a motor is coupled to the two capstans by means of a belt, located, together with the capstans, below the base plate which supports a resilient tire driving the tape.

An object of the invention is to devise a tape drive for higher acceleration and deceleration rates of magnetic tape, while additionally providing a drive less subject to fatigue failure, wear of a compliant member and timing errors.

Another object of the invention is to devise a high-performance tape drive system for ANSI-compatible cartridges, as well as analogous tape systems.

DISCLOSURE OF INVENTION

The above objects have been achieved in a magnetic tape drive which provides a pair of cylindrical belt guides in a position proximate to tangency with a capstan which transfers power to the tape rolls. Between the belt guides and the capstan, a power belt passes. This belt has an inner surface trained around the belt guides and an outer surface frictionally engaging the capstan. The belt may be reinforced with filaments of high tensile modulus, surrounded by an elastomeric matrix of high friction coefficient. A belt suitable for such purpose is described in U.S. Pat. No. 4,342,809 to Newell. The power belt is also trained around a drive wheel receiving power from the motor. The angular spacing of the belt guides relative to the capstan is such that an angle $\theta$ is made as large as practical, extending from the centers of the belt guides to the center of the capstan. The coefficient of friction, $\mu$, is such that the product of the two satisfies the equation $A=e^{\mu\theta}$ where e is the base of the natural logarithm and A is a number greater than one proportional to the mechanical advantage of the system. Mechanical advantage of a belt system is defined as the ratio of output to input force acting on the respective belt spans of the system. The consequent working force is the difference between said two span forces. In other words, by driving the capstan with the back side of the power belt, a mechanical advantage may be gained by employing friction in an exponential relationship with applied forces while providing a larger frictional surface, transferring more power to a capstan roller than either the limited area of contact of a single rotating capstan, or dual capstans. The large wrap angle around the capstan allows a distribution of force against the capstan so that thin, soft elastomeric surface materials with higher coefficients of friction may be used with high modulus cores, without the wear, lag and slip associated with the limited-contact, thick-tire designs of the prior art. The increased wrap angle also produces less of an indentation in the compliant drive surface so that compression-set and fatiguing of the roller is reduced. Lastly, the thinner cross section of the belt makes the drive system less subject to "g" forces at high velocity.

BRIEF DESCRIPTION OF DRAWINGS

FIG. 2 is a magnified top plan view of the capstan and belt guides of the present invention.

FIG. 3 is a side sectional view of the tape drive of the present invention, taken along lines 2—2 of FIG. 1.

BEST MODE FOR CARRYING OUT THE INVENTION

Figure 1:
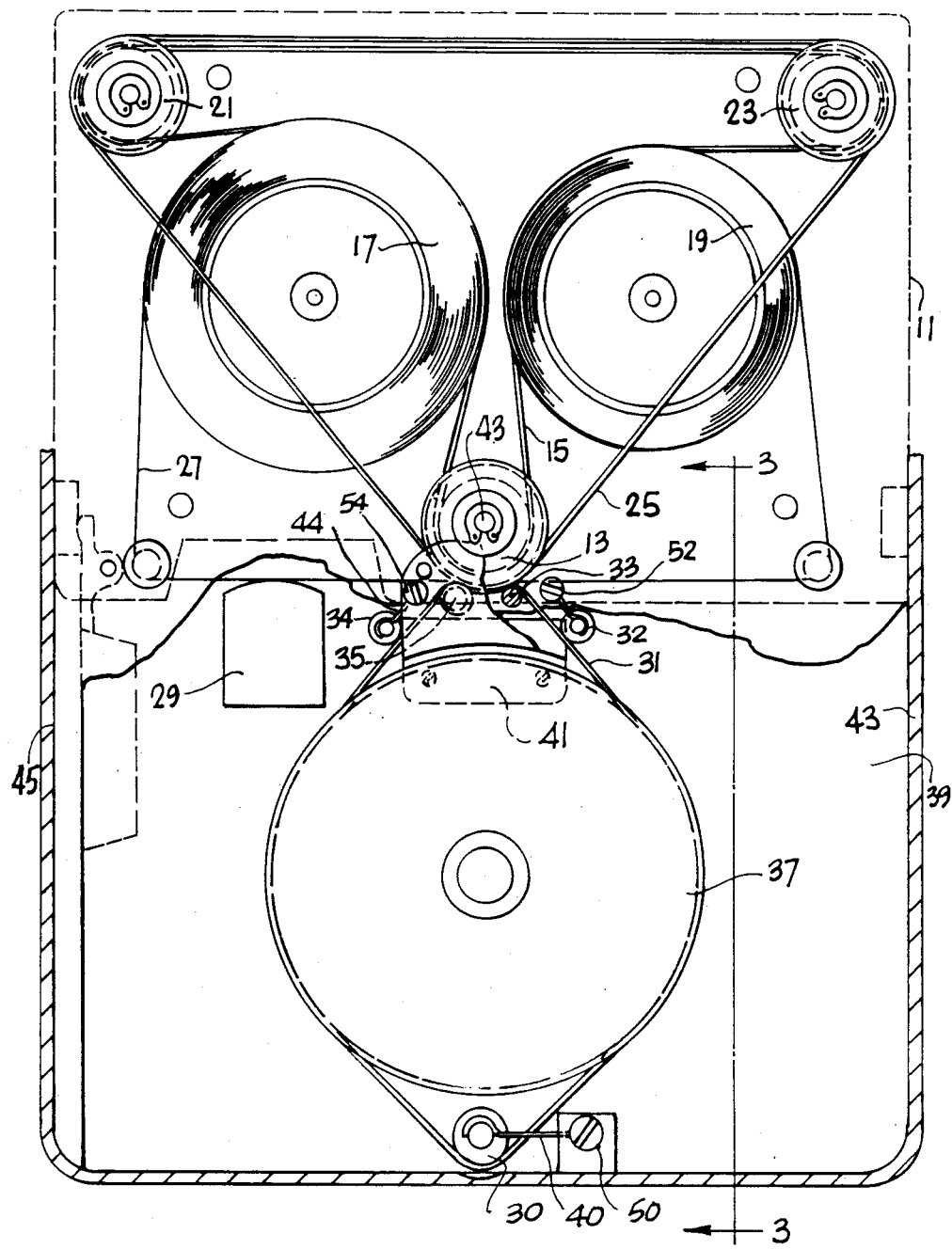
FIG. 1 is a top plan view of the magnetic tape drive of the present invention, shown in operation with tape rolls of an ANSI-compatible cartridge.

With reference to FIG. 1 a prior art ANSI-compatible tape cartridge, the subject of U.S. Pat. No. 4,172,569, assigned to the assignee of the present invention, is shown within the dashed line 11. The present invention is not restricted to such ANSI-compatible cartridges, but may be used anywhere a capstan, such as capstan 13 transfers rotary power external to the cartridge to tape rolls, internal to the cartridge. In the case of cartridge 11, a tape drive belt 15 is trained around the periphery of tape rolls 17 and 19, for providing rotary motion to the rolls. The belt completes a loop by being trained around guide rollers 21 and 23. The capstan 13 is forced to rotate by an external power source, thereby causing rotation of the tape belt 15. In the aforementioned U.S. patent, an auxiliary belt 25 is used to regulate tension in tape belt 15 and hence tape 27.

The present invention is concerned with a tape drive, i.e., a prime mover for tape rolls, such as those shown in cartridge 11. The purpose of any drive is to move magnetic tape 27 from one tape roll to the other in a reversible manner, past a magnetic transducer 29. The present invention is not concerned with the location of this transducer and it may be either a part of the tape drive, as shown, or may be on the opposite side of tape 27, within the tape enclosure.

In accord with the present invention, a new power belt 31 is provided having an inside surface trained around rotating belt guides 33 and 35. The belt loop is closed by being trained about drive wheel 37, mounted on the shaft of a motor which is below a support plate 39 and not visible in FIG. 1. Support plate 39 mounts the motor, which supports drive wheel 37, as well as a plate 41 from which the cylindrical belt guides 33 and 35 are perpendicularly supported. With reference to FIG. 2, the cylindrical belt guides 33 and 35 are spaced apart from each other and from drive wheel 37 in a position proximate to tangency with the capstan 13. Belt guides 33 and 35 are rotatably mounted on fixed spindles 24 and 26. Tensioning belt guides 30, 32 and 34 are rollers supported by stiff wires 40, 42 and 44 from screws 50, 52 and 54. The rollers are cantilevered by the wires, but rotate freely. The screws are used to provide tension by forcing the rollers against the belt. The cylindrical axes of the belt guides make an angle with the parallel capstan axis 43 equal to $\theta$, for example in the ANSI case, approximately 44°. In FIG. 1 the support base 39 may be seen to have side walls 43 and 45 which bring the cartridge capstan 13 symmetrically between the cylindrical belt guides 33 and 35. Such side walls are known in the prior art for bringing the guide roller of an ANSI-compatible cartridge into contact with a tire or wheel driving the roller.

The novel power belt 31 may be a simple belt, i.e., one having a cross section which is unitary in construction, or, depending on the acceleration rate, may be a compound belt, having a cross section of different belt materials, such as that described in the previously mentined copending application. In general, the outer surface is preferably a soft elastomeric material having a high coefficient of friction relative to guide roller 13. The relatively large surface area contacting capstan 13 permits a distribution of force applied to capstan 13, such that there is little indentation of the compliant drive surface, compared to prior art systems. Motion of belt 31 forces rotation of capstan 13, transferring power to tape drive belt 15, thereby imparting motion to tape rolls 17 and 19. Power belt 31 must be sufficiently stiff to be able to respond to rapid reversals of the drive wheel 37 without introducing unacceptable time lag and velocity overshoot due to stretch.

In the detail of FIG. 2, the capstan 13 may be seen having the central axis 43. The cylindrical belt guides 33 and 35 have central parallel axes 24 and 26. The angles subtended by these axes to capstan axis 43 is equal to $\theta$, indicated between the arrows A. The angle $\theta$ is important because it cooperates with the coefficient of friction, $\mu$, of the outside surface of the belt which contacts capstan 13. The cooperation is expressed by the equation $A=e^{\mu\theta}$ where e is the base of the natural logarithm and A is a number proportional to mechanical advantage of the system. If angle $\theta$ has a preferred value of 44°, A will equal 2 where $\mu$ equals 1; A will equal 5 where $\mu$ equals 2; A will equal 10 where $\mu$ equals 3. The advantage of the belt drive will be appreciated by continuing the ANSI Standard system example. In a friction capstan with a friction coefficient $\mu$ and static applied force $F_s$, the force F that can be coupled into the driven roller will be related to $\mu$ and $F_s$ by the equation $$\mu = F/F_s \qquad (1)$$

A belt system with a wrap angle $\theta$ and tension T will exert a static applied force $F_s$ through the drive pulley axis of $$F_s = 2T \cos\left(90 - \frac{\theta}{2}\right) \tag{2}$$

The ANSI Standard will allow a $\theta$ of 44°. Therefore, $$F_s = 0.749T \tag{3}$$

The ANSI Standard will allow an $F_s$ of 20 oz. Therefore, $$T = 26.7 \text{ oz.} \tag{4}$$

If a working force F is added to one of the belt spans, and tension T is maintained by idlers 32 and 34, then the maximum working force will be related to the belt system parameters by the equation $$\frac{F + T}{T} = A = e^{\mu\theta} \tag{5}$$

This gives a relationship between $\mu$ and F for our system of $$\mu = 1.3 \ln\left(\frac{F}{26.7} + 1\right) \tag{6}$$

The accelerating force $F_a$ will be the working force F less the drag force of the cartridge $F_D$. The ANSI Standard allows an $F_D$ of 4.5 oz. Expressing equations required friction in terms of accelerating force:

For capstan systems defined by equation (1), $$\mu = \frac{F_a + 4.5}{20} \tag{7}$$

For belt systems defined by equation (6):

$$\mu = 1.3 \ln\left(\frac{F_a + 4.5}{26.7} + 1\right) \tag{8}$$

The lag in tape velocity behind acceleration force for a belt system will depend on the elasticity of the belt, which can be defined by Hook's Law as $$\Sigma = \frac{\Delta L}{\Delta F_a L} = \frac{1}{EA} \tag{9}$$

where $\Delta L$ is the stretch from acceleration force $F_a$ in a belt span of length L, cross-sectional area A and tensile modulus E.

The ANSI Standard will allow a 5% overshoot. Allowing for lag in the cartridge belt and taking into account pulley ratios and belt span lengths for the typical drive geometry shown in FIG. 1, this requires an elastic coefficient in the belt of approximately $$\Sigma = \frac{1.33 \times 10^{-3}}{F_a} \text{ in/in/oz}^2 \tag{10}$$

A preferred material for the high-friction elastomer matrix is urethane rubber, in durometers between Shore A60 and 95, depending on the required friction coefficient.

A comparison of acceleration forces attainable with the two systems defined by equations (7) and (8) is made in the following table:

TABLE 1

| $\mu$ | Capstan System | Belt System | Advantage in Acceleration Forces |
|---|---|---|---|
| 0.3 | 1.5 oz. | 2.4 oz. | 1.6 |
| 0.5 | 5.5 oz. | 8.0 oz. | 1.5 |
| 0.7 | 9.5 oz. | 14.5 oz. | 1.5 |
| 1.0* | 9.5* oz. | 26.3 oz. | 2.8 |
| 2.0* | 9.5* oz. | 92.8 oz. | 9.8 |
| 3.0* | 9.5* oz. | 236.1 oz. | 24.9 |

*$\mu$ is limited for friction capstan by shearing angle, delay, fatigue, and compression-set.

Suitable reinforcement filaments for the belt can be selected based on economy and belt-stress considerations, which satisfy equation (10) for the acceleration force attainable by equation (8).

For a belt comparable in performance to the best friction capstan (30 ips per ANSI×3.54−1976), using the maximum allowable wrap angle, and tension idlers the minimum coefficient of friction would be $\mu = 0.55$ and the coefficient of elasticity would be $\Sigma = 1.24 \times 10^{-4}$ in/in/oz. or about $1 \times 10^{-4}$ in/in/oz. For a comparable belt system using the highest practical coefficient of friction of $\mu = 3.0$, the minimum wrap angle would be $\theta = 8°$.

Examples of belt materials and thicknesses for higher performance, using tension idlers, are given below, for a belt width of 0.1":

TABLE 2

| Max. Accel. Force oz. | $\mu$ | $\Sigma$ in/in/oz | Belt Thickness - Mils | | | | |
|---|---|---|---|---|---|---|---|
| | | | Silk | Aramid | Fiberglass | Steel | Carbon |
| 19.0 | 0.7 | 7.00 × 10$^{-5}$ | 4.0 | 2.5 | 2.0 | 0.8 | 0.6 |
| 26.3 | 1.0 | 5.06 × 10$^{-5}$ | 5.0 | 3.5 | 2.5 | 1.5 | 1.0 |
| 92.8 | 2.0 | 1.43 × 10$^{-5}$ | N/A* | N/A* | 9.0 | 3.5 | 3.0 |
| 236.1 | 3.0 | 0.56 × 10$^{-5}$ | N/A* | N/A* | N/A* | 9.5 | 8.0 |

*Belt thickness is limited by interlayer shearing forces causing elastomer matrix fatigue.

It can thus be seen that with soft-surfaced belts having high coefficient of friction, such as urethane rubber, particularly when reinforced with high-tensile-modulus filaments, a very high mechanical advantage can be obtained.

In FIG. 3, a side sectional view of the invention shows the support base 39 having a cantilevered lip 47 supporting a lower wall 49 of cartridge 11. The plate 41 is seen to have a cross sectional S shape, with a lower portion 63 secured to a base 39 and an upper portion 65 for securing the cylindrical belt guide 35, mounted in an inverted position such that the fixed part of the guide is secured by a threaded tubular nut while the lower portion of the belt guide preferably rotates and is supported laterally by annular roller bearings 38. The portion of the belt guide which comes in contact with power belt 31 may have flanges for guiding the power belt 31. The outer surface of belt 31 contacts capstan roller 13 in the cartridge, transferring power thereto. Drive wheel 37 has a central axial shaft 51, projecting through support base 39 to a housing 53 wherein a motor 55 resides. The housing closes the top of the drive, including the cylindrical belt guides, protecting the moving members, as well as securely holding the cartridge in place. Such a housing is not essential as to its detail. Motor 55 is a high torque bidirectional motor which can rapidly accelerate and decelerate.

While the present invention has been described relative to cartridges, other tape rolls may be similarly driven.

The following is a set of exemplary parameters for the tape drive system of the present invention. Preferred tape is ¼ inch cartridge per specification ANSI×3.55—1977, and U.S. Pat. No. 4,172,569. A preferred drive is plug-compatible with vacuum-column drives per ANSI×3.54—1976, having a write-to-read head-gap spacing of 0.150 inches and an acceleration distance of 0.055 inches. The settling distance at normal speed is 0.010 inches, while the deceleration distance is 0.055 inches. The settling distance at stop is 0.010 inches. The sum of these distances yields the total inter-record gap, which is 0.280 inches. A preferred motor is Honeywell 33VM62, acceleration torque 210 inch ounces at 27 amps, 40 volts. The power belt material is steel wire (Elgiloy) reinforced, 60 durometer, urethane matrix, 0.1" wide by 0.003" thick. The power belt Young's modulus is $3\times 10^7$ psi and the power belt coefficient of friction is 1.5 min. The preferred drive wheel peripheral surface is hard anodized aluminum. The preferred belt guide profile is flat, with flanges. The preferred guide roller profile is flat, without flanges. The expected maximum acceleration/deceleration rate is $51\times 10^3$ inches per second squared. The expected maximum read/write tape velocity is 75 inches per second.

These parameters are merely exemplary and not critical. Those skilled in the art will realize many variations of the above within the spirit and scope of the present invention.

Figure 4:
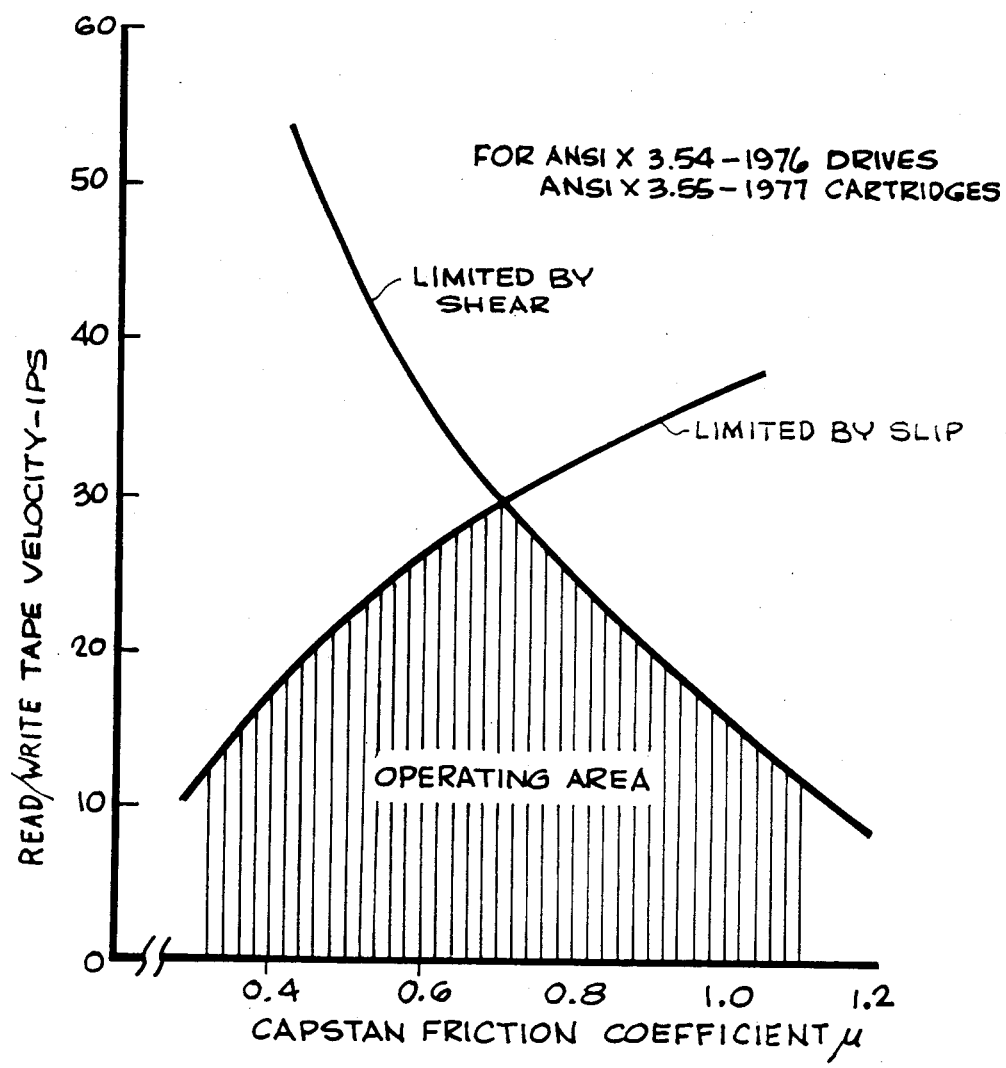
FIG. 4 is a plot of read/write tape velocity, in inches per second, plotted against capstan friction coefficient, $\mu$ for prior-art friction capstan drives, ANSI-compatible with vacuum-column drives and ANSI-compatible removable cartridges.

With reference to FIG. 4, a plot of read/write tape velocity (in inches per second) against capstan friction coefficient, $\mu$, is shown for prior-art power-transfer apparatus meeting the previously mentioned ANSI×3.54—1976 drive standard and ANSI×3.55—1977 cartridge standard. The area under the two curves is the allowable operating area of a system using such apparatus per such standards.

I claim:

1. For tape data cartridges of the type having a pair of tape rolls mounted in reversible tape supply and takeup relation with a tape path therebetween, a capstan and first belt guides spaced apart from the tape rolls, but disposed in said tape path, with a first belt having an inside surface trained about the first belt guides and the capstan and having an outside surface in contact with the tape for providing motive power to the tape, a drive comprising, second belt guides spaced proximate to the capstan position and a driven power wheel independently mounted of the mounting for said cartridge tape rolls, and a second belt having an inside surface trained about the second belt guides and the driven power wheel and having an outside surface contacting the capstan over an angular portion of the capstan surface, said second belt frictionally engaging said capstan whereby the second belt indirectly drives the tape by transferring power through the capstan to the first belt and may be removably brought into contact with the capstan.

2. The drive of claim 1 wherein the power belt contacts the capstan with a coefficient of friction $\mu$, the second belt guides having axes making an angle $\theta$ with an axis of the capstan, such that the combination of $\mu$ and $\theta$ satisfies the equation $$A = e^{\mu\theta}$$

where e is the base of the natural logarithm and A is a number greater than 1.6, representing the mechanical advantage of the ratio of the output to input forces acting on the respective belt spans of the second belt.

3. The drive of claim 2 wherein the angle $\theta$ is in the range of 35 to 45 degrees.

4. The drive of claim 2 where A is between 2 and 5.

5. The drive of claim 2 where A is between 5 and 10.

6. The drive of claim 1 wherein the outer surface of said power belt has a coefficient of friction $\mu$ of at least 0.6.

7. The drive of claim 6 wherein the power belt has a longitudinal elastic coefficient of less than $1\times 10^{-4}$ in/in/oz.

8. The drive of claim 1 wherein the outer surface of said belt is made of elastomeric material.

9. The drive of claim 1 wherein the outer surface of said belt is urethane rubber.

10. The drive of claim 1 wherein said belt guides rotate about their respective axes.

11. The drive of claim 1 wherein the diameter of the drive wheel exceeds the diameter of the belt guides by more than five times.

12. The drive of claim 1 wherein the second belt guides have auxiliary belt guides having bias means for maintaining tension in the power belt during maximum acceleration.

13. A drive system for tape cartridges comprising, a tape cartridge of the type having tape rolls within a cartridge housing driven by a drive belt receiving power from a rotating cartridge capstan, the cartridge capstan having a portion facing outwardly from within the housing, with the tape rolls behind the cartridge capstan in a triangular configuration, a support surface for receiving said tape cartridge, a drive wheel associated with the support surface having a central axis mounted for rotation and receiving bidirectional rotational energy from a reversible motor, a pair of belt guides spaced apart from each other and from the drive wheel in a position proximate to tangency with the capstan, the belt guides making an angle $\theta$ with the capstan axis greater than 20°, and a power belt having an inner surface trained around the belt guides and the drive wheel and an outer surface adapted to frictionally engage the capstan, substantially without slippage, the power belt being outside of the triangular configuration formed by the tape rolls and the capstan, whereby the power belt indirectly drives the tape by transferring power through the capstan to the drive belt.

14. The drive system of claim 13 wherein the power belt engages the capstan with a coefficient of friction $\mu$ and said angle is equal to $\theta$ such that the combination of $\mu$ and $\theta$ satisfies the equation $A=e^{\mu\theta}$ where e is the base of the natural logarithm and A is a number greater than unity proportional to the mechanical advantage of the drive system.

15. A drive for a tape data cartridge which includes a pair of tape rolls driven by a drive belt receiving power from a rotating capstan, the tape rolls and capstan having a triangular configuration within the tape cartridge comprising,
  a drive wheel having a central axis mounted for rotation and receiving bidirectional rotational energy from a reversible motor,
  a pair of belt guides spaced apart from each other and from the drive wheel in a position proximate to tangency with the capstan driving the cartridge tape rolls, the capstan having an axis of rotation, the belt guides having axes making an angle $\theta$ with the capstan axis greater than 10°,
  a power belt having an inner surface trained around the belt guides and the drive wheel and having an outer surface adapted to frictionally engage the capstan substantially without slippage, and
  auxiliary means contacting the power belt for maintaining tension in the power belt during maximum acceleration, the auxiliary means and the power belt being outside of the cartridge, whereby the power belt indirectly drives the tape by transferring power through the capstan to the drive belt.

16. For high speed data cartridges of the type having a pair of tape rolls and a tape path therebetween, with the tape rolls driven by contact with a drive belt, the drive belt powered from a capstan receiving power from outside the cartridge, the tape drive comprising,
  housing means for receiving a data cartridge in a position, the cartridge capstan outwardly exposed in said position,
  at least two belt guides disposed in said housing means in positions proximate to spaced apart locations along the circumferential periphery of the capstan,
  a power belt having an inside surface trained about said belt guides and having an outside surface making frictional contact with the capstan over an angular portion of the capstan surface, and
  means for bidirectionally driving said power belt for bidirectionally rotating said capstan, whereby the power belt transfers power to the capstan which, in turn, transfers power to the drive belt in the data cartridge.

17. The drive of claim 16 wherein the power belt contacts the capstan with a coefficient of friction $\mu$, the second belt guides having axes making an angle $\theta$ with an axis of the capstan, such that the combination of $\mu$ and $\theta$ satisfies the equation $$A=e^{\mu\theta}$$

where e is the base of the natural logarithm and A is a number greater than 1.6, representing the mechanical advantage of the ratio of the output to input forces acting on the respective belt spans of the second belt.

18. The drive of claim 17 wherein the angle $\theta$ is in the range of 35 to 45 degrees.

19. The drive of claim 17 where A is between 2 and 5.

20. The drive of claim 17 where A is between 5 and 10.

21. The drive of claim 16 wherein the outer surface of said power belt has a coefficient of friction $\mu$ of at least 0.6.

22. The drive of claim 21 wherein the power belt has a longitudinal elastic coefficient of less than $1\times10^{-4}$ in/in/oz.

23. The drive of claim 16 wherein the outer surface of said belt is made of elastomeric material.

24. The drive of claim 16 wherein the outer surface of said belt is urethane rubber.

25. The drive of claim 16 wherein said belt guides rotate about their respective axes.

26. The drive of claim 16 wherein the second belt guides have auxiliary belt guides having bias means for maintaining tension in the power belt during maximum acceleration.

* * * * *